US009007875B2

(12) United States Patent
Nurse et al.

(10) Patent No.: US 9,007,875 B2
(45) Date of Patent: Apr. 14, 2015

(54) MEDICINE STATION AND ALERT DEVICE

(76) Inventors: Lloyd Cleveland Nurse, Decatur, GA (US); Darien Okinza Nurse, Decatur, GA (US)

( * ) Notice: Subject to any disclaimer, the term of this patent is extended or adjusted under 35 U.S.C. 154(b) by 337 days.

(21) Appl. No.: 13/168,324

(22) Filed: Jun. 24, 2011

(65) Prior Publication Data

US 2011/0254656 A1 Oct. 20, 2011

Related U.S. Application Data

(63) Continuation-in-part of application No. 12/466,332, filed on May 14, 2009, now Pat. No. 7,993,055, and a continuation-in-part of application No. 12/960,800, filed on Dec. 6, 2010.

(51) Int. Cl.

| | |
|---|---|
| ***G06F 17/00*** | (2006.01) |
| ***G04B 47/00*** | (2006.01) |
| ***A61J 7/04*** | (2006.01) |
| ***G04C 23/40*** | (2006.01) |
| ***G04G 11/00*** | (2006.01) |
| ***G04G 13/02*** | (2006.01) |
| *A61J 1/03* | (2006.01) |

(52) U.S. Cl.

CPC ............... *A61J 7/0481* (2013.01); *G04C 23/40* (2013.01); *G04G 11/00* (2013.01); *G04G 13/026* (2013.01); *A61J 1/03* (2013.01); *A61J 7/0472* (2013.01)

(58) Field of Classification Search

USPC ............ 368/244, 277, 276, 284, 10; 700/242; 221/15

See application file for complete search history.

(56) References Cited

U.S. PATENT DOCUMENTS

| | | | | |
|---|---|---|---|---|
| 4,001,805 | A | 1/1977 | Golbe | |
| 4,039,957 | A | 8/1977 | Jennings | |
| 4,258,354 | A | 3/1981 | Carmon | |
| 4,490,711 | A * | 12/1984 | Johnston | 340/309.4 |
| 4,630,248 | A | 12/1986 | Scott | |
| 5,012,223 | A | 4/1991 | Griebell et al. | |
| 5,408,443 | A * | 4/1995 | Weinberger | 368/10 |
| 6,018,289 | A * | 1/2000 | Sekura et al. | 340/309.4 |
| 6,198,383 | B1 | 3/2001 | Sekura | |
| 6,337,836 | B1 | 1/2002 | Eidelson | |
| 6,529,446 | B1 | 3/2003 | de la Huerga | |
| 6,545,592 | B2 | 4/2003 | Weiner | |

(Continued)

FOREIGN PATENT DOCUMENTS

WO 2010132503 A 11/2010

OTHER PUBLICATIONS

Reusable—dictionary.com; May 3, 2014.*

(Continued)

*Primary Examiner* — Sean Kayes

(74) *Attorney, Agent, or Firm* — LeonardPatel PC

(57) ABSTRACT

A medicine station or stand-alone alert device has a processor having access to memory, wherein the memory stores a control module, and the processor is configured to execute the modules stored in the memory. The medicine station or stand-alone alert device also includes one or more indicators. The control module is configured to periodically check for an external notification from a primary alert device that it is time to take a medication. Upon receiving the external notification, the control program is configured to cause the medicine station or stand-alone alert device to enter an amplified alert mode with respect to the primary alert device via the one or more indicators.

14 Claims, 16 Drawing Sheets

(56) References Cited

U.S. PATENT DOCUMENTS

| | | | |
|---|---|---|---|
| 6,667,936 | B1 | 12/2003 | Ditzig |
| 6,717,598 | B1 | 4/2004 | Melton, Jr. et al. |
| 6,724,298 | B2 | 4/2004 | Smith |
| 6,812,825 | B1 | 11/2004 | Volk |
| 6,817,192 | B2 | 11/2004 | Ector |
| 6,845,064 | B2 | 1/2005 | Hildebrandt |
| 6,934,220 | B1 | 8/2005 | Cruitt |
| 7,158,011 | B2 | 1/2007 | Brue |
| 7,199,700 | B1 | 4/2007 | McPherson |
| 7,330,101 | B2 | 2/2008 | Sekura |
| 7,362,660 | B2 | 4/2008 | Hildebrandt |
| 7,362,663 | B2 | 4/2008 | Kagan |
| 7,382,231 | B2 | 6/2008 | Blumberg |
| 7,454,257 | B2 | 11/2008 | Mcpherson et al. |
| 7,542,379 | B2 * | 6/2009 | Kimel et al. .................... 368/10 |
| 7,545,257 | B2 * | 6/2009 | Brue ........................ 340/309.16 |
| 7,639,120 | B2 | 12/2009 | Sekura |
| 2002/0070227 | A1 * | 6/2002 | Ferruccio ........................ 221/15 |
| 2003/0070681 | A1 | 4/2003 | Rydgren |
| 2003/0151499 | A1 | 8/2003 | Huang |
| 2004/0155780 | A1 | 8/2004 | Rapchak |
| 2004/0156418 | A1 | 8/2004 | Debord et al. |
| 2006/0017559 | A1 | 1/2006 | Albert |
| 2006/0061454 | A1 | 3/2006 | Debord et al. |
| 2006/0139150 | A1 | 6/2006 | Brue |
| 2006/0146654 | A1 | 7/2006 | Yeager |
| 2006/0167345 | A1 | 7/2006 | Vespasiani |
| 2006/0187002 | A1 | 8/2006 | Terenna |
| 2006/0187003 | A1 | 8/2006 | Terenna |
| 2006/0215495 | A1 | 9/2006 | Soled et al. |
| 2006/0227669 | A1 | 10/2006 | Pennaz et al. |
| 2006/0280035 | A1 | 12/2006 | Walker et al. |
| 2006/0285441 | A1 | 12/2006 | Walker et al. |
| 2007/0091726 | A1 | 4/2007 | Stauffer |
| 2008/0068159 | A1 | 3/2008 | Bradus et al. |
| 2008/0074951 | A1 * | 3/2008 | Hubicki .......................... 368/14 |
| 2008/0080319 | A1 * | 4/2008 | Niemiec et al. ................. 368/10 |
| 2008/0117719 | A1 | 5/2008 | Hildebrandt |
| 2008/0151695 | A1 | 6/2008 | Kimel et al. |
| 2009/0027213 | A1 | 1/2009 | Debord et al. |
| 2009/0040874 | A1 | 2/2009 | Rooney |
| 2009/0109800 | A1 * | 4/2009 | Kimel et al. .................... 368/10 |
| 2009/0209896 | A1 | 8/2009 | Selevan |
| 2009/0281657 | A1 * | 11/2009 | Gak et al. ...................... 700/242 |
| 2009/0281835 | A1 * | 11/2009 | Patwardhan et al. ............. 705/3 |
| 2010/0220553 | A1 | 9/2010 | Nurse et al. |
| 2011/0041845 | A1 | 2/2011 | Solomon et al. |

OTHER PUBLICATIONS

Office Action dated Mar. 20, 2013, issued in parent U.S. Appl. No. 12/960,800.

International Search Report from PCT Appln. No. PCT/US2010/034448 mailed Jan. 20, 2011 (corresponds with parent U.S. Appl. No. 12/466,332).

Office Action dated Sep. 22, 2010 from parent U.S. Appl. No. 12/466,332.

Final Office Action issued in Appln. U.S. Appl. No. 12/960,800 on Aug. 29, 2013.

* cited by examiner

MEDICINE STATION AND ALERT DEVICE

CROSS REFERENCE TO RELATED APPLICATIONS

This application is a continuation-in-part of, and claims priority of, U.S. patent application Ser. No. 12/466,332, filed May 14, 2009, and Ser. No. 12/960,800, filed Dec. 6, 2010. The subject matter of these earlier-filed applications is hereby incorporated by reference in its entirety.

FIELD

The present invention generally relates to a medicine station and alert device. More specifically, the present invention relates to a medicine station that includes a control module, a timing module and an announcing module and is configured notify and track dosing times and record and transmit usage data for one or more medications. The medicine station is configured to work with primary alert devices that may be attached to a flat or curved surface of a medicine container. A rechargeable battery in a primary alert device may also be recharged when placed in a compartment of an announcer tray. It should be noted that different novel features may be incorporated into different embodiments and the departure from one or more novel features does not suggest a departure from the novelty of any other feature or the entire system.

BACKGROUND

Medicine saves lives, but proper use is often necessary to ensure efficacy. Many individuals not only forget to take their medicine, but they often forget that they may have already taken their medicine within a given dosing period. In situations where multiple medications are used, patients may become confused as to which medicine to take and when. Further, confusion and danger may exist when people move medicine from the original containers into pill boxes in an effort to help manage their medications. Situations also exist where there is a need for adequate separation between certain medications so as to eliminate the adverse effects of drug interactions. Additionally, there is a need for the elderly and other challenged individuals to be able to take their medicine in a timely manner without assistance, which may lead to cost savings. In the ever-evolving world of genetic science, there exists the need to ensure, and closely monitor, the medicine intake of patients by electronic reporting methods.

SUMMARY

Certain embodiments of the present invention may provide solutions to the problems and needs in the art that have not yet been addressed or fully solved by conventional alert systems. For example, certain embodiments of the present invention pertain to a medicine station and an alert device that has an associated amplifying announcer module with a permanent power source.

In one embodiment, an apparatus includes a processor having access to memory. The memory stores a control module, a timing module and an announcer module, and the processor is configured to execute the modules stored in the memory. The apparatus also includes a medicine tray including a plurality of compartments. Each compartment is configured to store a medication. The apparatus further includes one or more indicators. The control module is configured to determine from the timing module when a medication should be taken. The control program is configured to initiate the announcer module to cause the one or more indicators to indicate to a patient that it is time to take a medication. The control module is configured to periodically check for an external notification or receive notifications by its imbedded sensors from a primary alert device that it is time to take a medication. Upon receiving the external notification, the control program is configured to cause the apparatus to enter an amplified alert mode with respect to the primary alert device via the one or more indicators.

In another embodiment, an apparatus includes a processor having access to memory. The memory stores a control module, a timing module and an announcer module, and the processor is configured to execute the modules stored in the memory. The apparatus also includes one or more indicators. The control module is configured to determine from the timing module when a medication should be taken. The control program is configured to initiate the announcer module to cause the one or more indicators to indicate to a patient that it is time to take a medication. When a predetermined time period has elapsed and a patient has not deactivated the alert, the control module is configured to instruct the apparatus to switch alert modes to ensure recognition and compliance by the user.

In yet another embodiment, a computer-implemented method includes periodically checking, via a controller, for an external notification from a primary alert device that it is time to take a medication. The computer-implemented method also includes causing, via the controller, one or more indicators to generate an amplified alert with respect to the primary alert device.

Primary alert devices may use simple countdown timers configured in tandem to execute auto-stop or restart features, may be made rigid or flexible and may be attached to the bottom surface or side of medicine containers.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
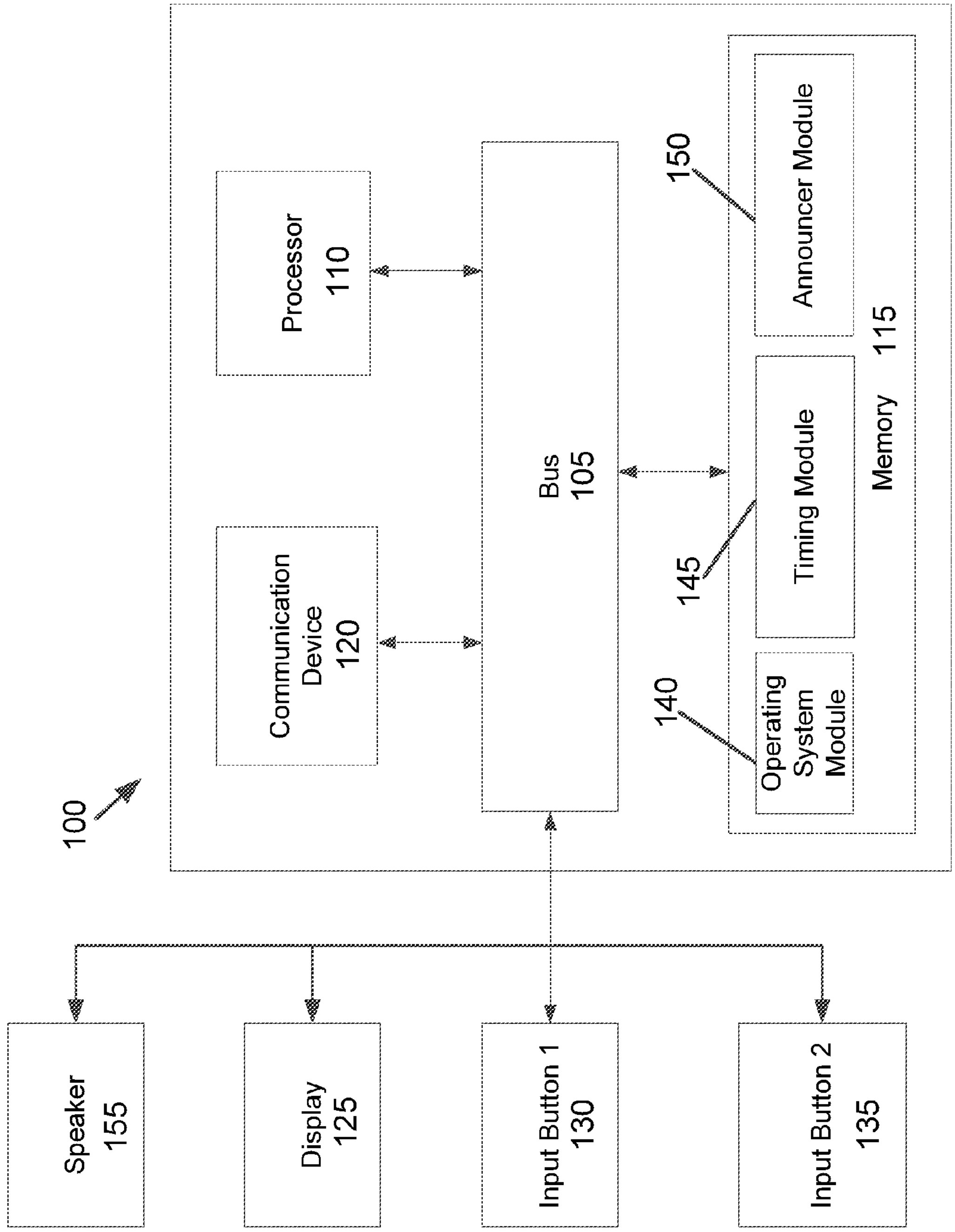
FIG. 1 illustrates a digital controller, according to an embodiment of the present invention.

It will be readily understood that the components of various embodiments of the present invention, as generally described and illustrated in the figures herein, may be arranged and designed in a wide variety of different configurations. Thus, the following more detailed description of the embodiments of the apparatuses and methods of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

In the field of health care, proper usage of medications in the manner prescribed by a physician is important to the effectiveness thereof. Generally, printed dosing information is affixed to the side of a medicine container. However, keeping track of dosing times may be especially difficult where a patient must manage multiple medications, or where a patient is blind, elderly, or physically challenged. Accordingly, a tool for improving an individual's ability to appropriately engage in such daily activities may be beneficial. Such a tool may improve, for example, how well a patient is able to follow the dosing instructions for prescribed medications.

Some embodiments of the present invention pertain to a medicine station with an alert device having a control module, a timing module and an announcer module that facilitate timing, tracking and monitoring of various activities, such as the time at which medications should be taken. Such an alert device may facilitate dosing times that are at irregular intervals or fall at different times each day. The alert device may also enable dosing times to be custom-tailored to the needs of a specific patient based on factors including, but not limited to, weight, age, gender, ethnicity, specific genes, etc. Further, critical new drugs that must be abandoned because of dosing concerns may be approved if an adherence tool, such as some embodiments of the present invention, is available. Additionally, alarm creep due to response time and progressive errors in accuracy and consistency, which is not recognized or remedied by existing timing devices, may be remedied by some embodiments of the present invention.

FIG. 1 illustrates a digital controller 100 for an alert device, according to an embodiment of the present invention. Controller 100 includes a bus 105 or other communication mechanism for communicating information, and a processor 110 coupled to bus 105 for processing information. Processor 110 may be any type of general or specific purpose processor, including a central processing unit ("CPU") or application specific integrated circuit ("ASIC"). Controller 100 further includes a memory 115 for storing information and instructions to be executed by processor 110. Memory 115 can be comprised of any combination of random access memory ("RAM"), read only memory ("ROM"), flash memory, cache, static storage such as a magnetic or optical disk, or any other types of non-transitory computer-readable media or combination thereof. Additionally, controller 100 includes a communication device 120, such as a wireless network interface card, to provide wireless access to a network. However, such a communication device generally adds cost and may not be desired for cost-sensitive applications, so it is not present in certain embodiments. Rather, a more simple communication mechanism such as a serial RS-232 interface may be used. Such an interface may be found on suitable microprocessors, and may use a pair of wires to communicate with an external device, such as a computer. Such communication devices and/or mechanisms may, for example, be used to exchange externally supplied dosing information with controller 100.

Computer-readable media may be any available media that can be accessed by processor 110 and may include both volatile and non-volatile media, removable and non-removable media, and communication media. Communication media may include computer readable instructions, data structures, program modules or other data in a modulated data signal such as a carrier wave or other transport mechanism and includes any information delivery media.

Processor 110 is further coupled via bus 105 to a display 125, such as a Liquid Crystal Display ("LCD"), for displaying information, such as the number of doses remaining, to a user. A first button 130 and a second button 135 are further coupled to bus 105 to enable a user to interact with controller 100.

In one embodiment, memory 115 stores software modules that provide functionality when executed by processor 110. The modules include an operating system module 140 that provides operating system functionality for controller 100. In simpler implementations, or in all-hardware implementations, a more complex operating system may not be present in order to reduce memory requirements. Rather, a control module may provide control functionality. The modules further include a timing module 145 that is configured to track the specific time a person takes one or more medication. Timing module 145 may, for example, make use of Real Time Clock (RTC) functionality of processor 100 to track various time intervals, or dosing schedules, for various medications by taking advantage of a clock in or accessible by processor 100. In some embodiments, for example, processor 100 may use 32.768 kHz quartz crystals and store the time in a register or other memory. At such a frequency, there are exactly 2^15 oscillations per second at the appropriate temperature, or with temperature compensation logic. Controller 100 also includes an announcer module 150 that notifies an individual when it is time to take a medication at one or more dosing times, as indicated by timing module 145. The alerts for announcer module 150 may be realized via speaker 155.

Presenting the above-described functions as being performed by a "controller" is not intended to limit the scope of the present invention in any way, but is intended to provide one example of many embodiments of the present invention. Indeed, apparatuses disclosed herein may be implemented in localized and distributed forms consistent with computing technology.

It should be noted that some of the controller features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a non-transitory computer-readable medium, which may be, for instance, a hard disk drive, flash device, random access memory (RAM), cache memory, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
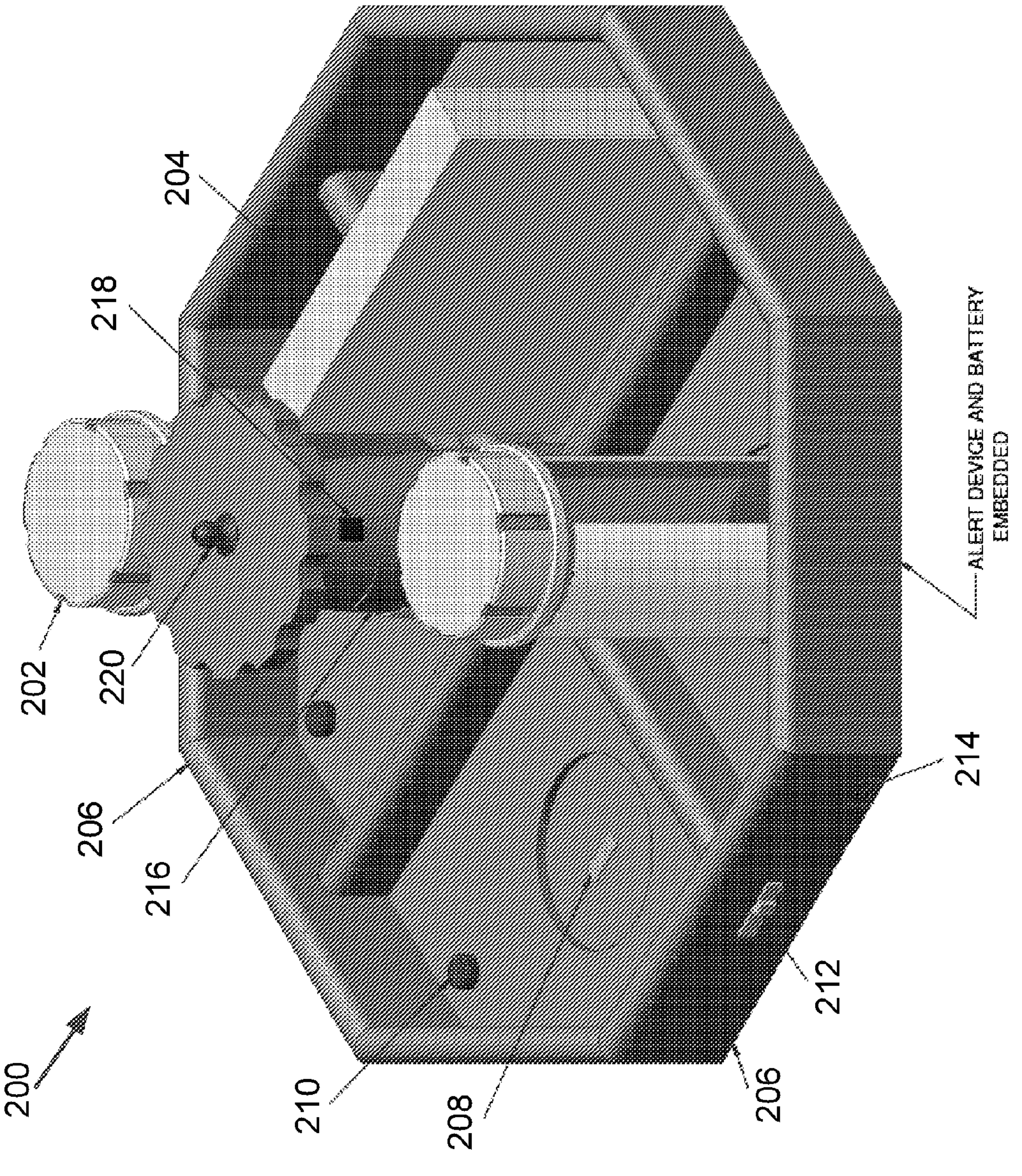
FIG. 2 illustrates an elevated view of a medicine station, according to an embodiment of the present invention.

FIG. 2 illustrates a medicine station 200, according to an embodiment of the present invention. The operations of medicine station 200 are controlled by a digital controller (not visible) housed within the station. Unlike the controller 100 of FIG. 1, the controller of medicine station 200 carries out operations such as activating light-emitting diodes (LEDs) and producing amplified alert sounds in response to an indication from an alert device that it is time to take a medication. In this embodiment, medicine station 200 itself functions as the alert device. However, in some embodiments, it is possible for a separate alert device to be placed on each medicine container, and medicine station 200 may communicate remotely with the alert devices. In more simple variations of such embodiments, medicine station 200 may communicate with chips placed on medicine containers, such as Radio Frequency Identification (RFID) tags. These tags may indicate information such as the dosing interval and type of the medication, which medicine station 200 can then use to determine dosing schedules.

Medicine station 200 also includes a medicine tray 206 that is divided into four sections, or compartments, in this embodiment. Each section has a sensor 208 and an LED active alert indicator 210. Sensor 208 detects an alert signal emitted from an alert device associated with a medicine container. Medicine station 200 houses two medicine containers 202 and a medicine box 204, but is capable of housing multiple medicine containers/medicine boxes in the four compartments of the depicted embodiment. A person may choose to place medications with the same dosing schedule in the same section of medicine tray 206. The number of medicine containers that may be housed, the location of compartments on the tray, the presence of dividers between the compartments, and other such features are a matter of design choice, as would be recognized by a person of ordinary skill in the art.

Medicine station 200 also has a selector switch 212 that turns medicine station 200 on and off and may control volume intensity or other user-specific requirements. Medicine station 200 is powered by an embedded battery in this embodiment (not visible). In some embodiments, another power source, such as an alternating current (AC) or direct current (DC) power source from a wall outlet, or solar power, may be used in addition to, or in lieu of, battery power. Medicine station 200 also includes a USB port 214 for communication with an external computing device, such as a desktop or laptop computer. Medicine station 200 may be configured to communicate with a cell phone, PDA, tablet computer, or any other suitable computing device. Medicine station 200 may also utilize a dialer either directly or through any of these external devices in order to call the phone number of the user, a relative, a nurse or any other emergency number whenever alerts are not attended to within a certain period of time.

Medicine station 200 includes an LCD display 216 that displays relevant information to a user, such as a countdown to the next dose and the number of doses remaining in the container. A noise making device 218, such as a speaker, alerts the user that it is time to take a medication. A flashing bright light 220 is also included to provide an additional or alternative means for alerting a user. This means may be especially useful if the user is hearing-impaired. The lights, noise making device and LCD display, or "indicators", convey to a patient that it is time to take a medication.

Figure 3:
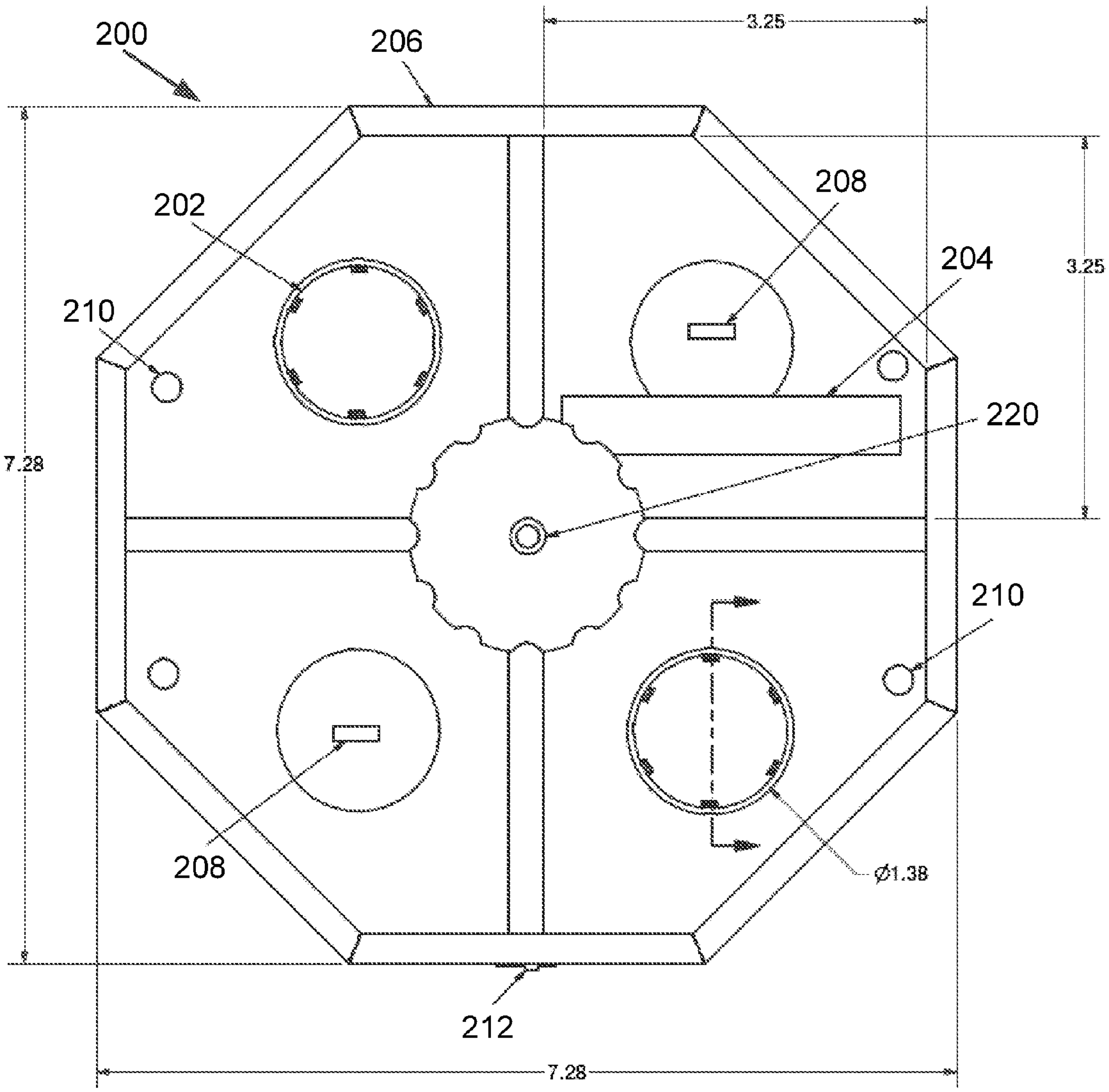
FIG. 3 illustrates a top view of a medicine station with dimensions, according to an embodiment of the present invention.

FIG. 3 illustrates a top view of medicine station 200 with dimensions, according to an embodiment of the present invention. In this embodiment, each section of medicine station 200 has a width and height of 3.25 inches. Medicine containers 202 each have a diameter of 1.38 inches. As can be seen, in this embodiment, medicine station 200 takes the shape of an octagon divided into four equal partitions. The overall width and height of medicine station 200 is 7.28 inches. Each section is separated from adjacent sections by a divider so medication remains within its section. The measurements provided here with respect to various embodiments of the present invention are only by way of example and are not limiting in any way. Other measurements, shapes and materials may be used by design choice, as would be recognized by a person of ordinary skill in the art.

Figure 4:
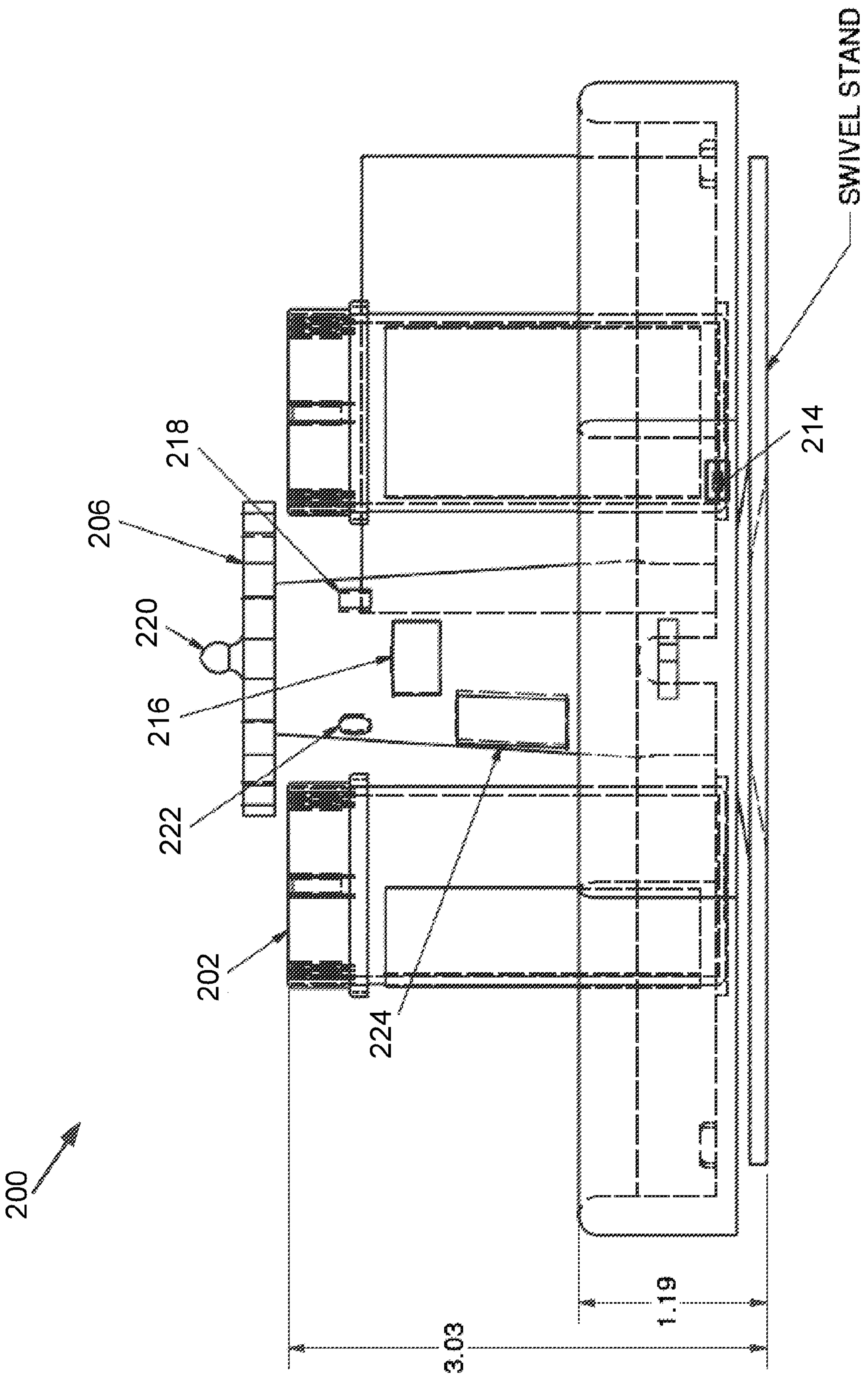
FIG. 4 illustrates a side view of a medicine station with dimensions, according to an embodiment of the present invention.

FIG. 4 illustrates a side view of medicine station 200 with dimensions, according to an embodiment of the present invention. Medicine station 200 has a swivel stand as a base that facilitates rotation of medicine tray 206. The height from the bottom of the swivel stand to the top lip of the outer edge of medicine tray 206 is 1.19 inches. The height from the bottom of the swivel stand to the top of medicine container 202 is 3.03 inches.

Medicine station 200 also includes a second light 222 and a wired or wireless communication device 224. Communication device 224 allows medicine station 200 to communicate with an external computing device, such as a personal computer, cell phone, PDA, etc. The communication device 224 may upload status information pertaining to its operation, medicine dosing compliance, or any other information that may be desired to the personal computing device. The information may then be transferred to a medical facility for patient progress analysis. Wired or wireless communication device 224 may also download program updates, dosing schedules, or any other pertinent updates from the personal computing device. In some embodiments, communication device 224 may be configured to perform data downloads wirelessly without a direct connection to external devices.

Figure 5:
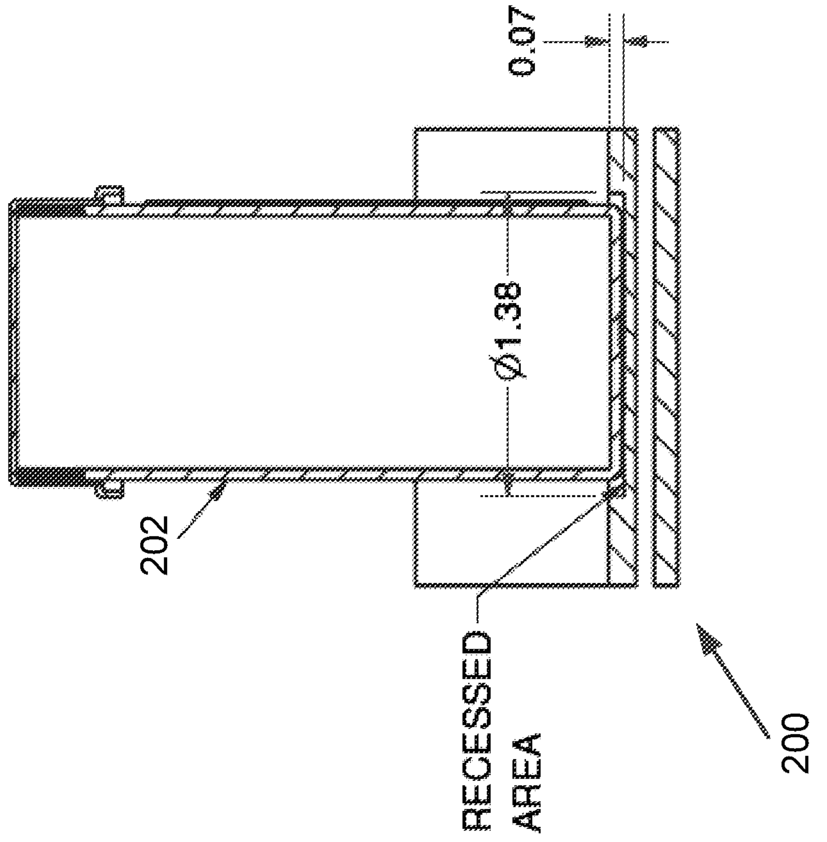
FIG. 5 illustrates a side view of a medicine container seated in a medicine station, according to an embodiment of the present invention.

FIG. 5 illustrates a side view of medicine container 202 seated in medicine station 200, according to an embodiment of the present invention. Medicine container 202 has a diameter of 1.38 inches. Medicine container 202 sits within a recessed area of medicine station 200 that is slightly wider than the diameter of medicine container 202. The recessed area has a depth of 0.07 inches.

Figure 6:
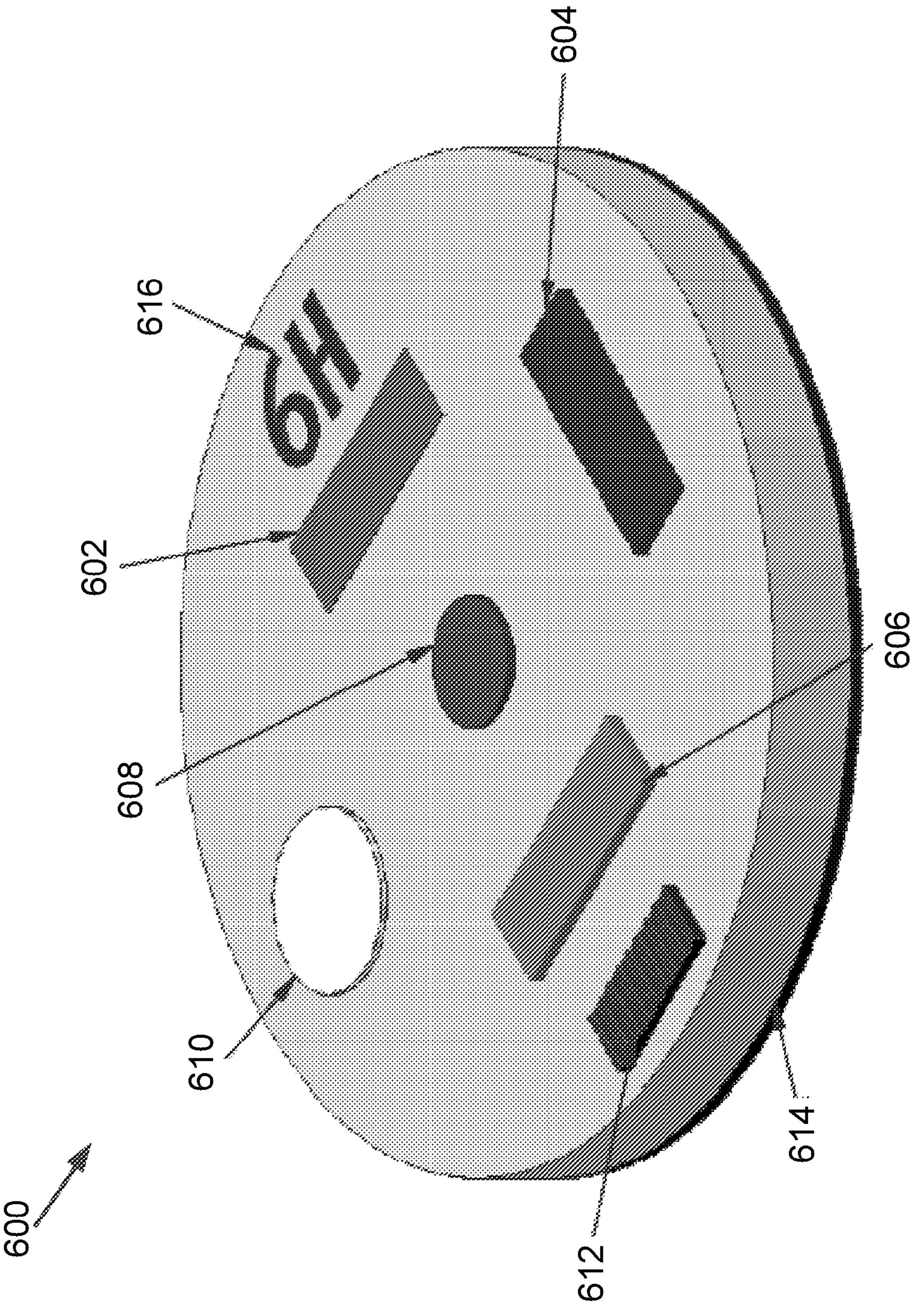
FIG. 6 illustrates an elevated view of an alert device, according to an embodiment of the present invention.

FIG. 6 illustrates an elevated view of an alert device 600, according to an embodiment of the present invention. The operations of alert device 600 (i.e., the primary alert device) are controlled by a digital controller (not visible) housed within the device, such as controller 100 of FIG. 1. Alert device 600 has a first timing element 602, a second timing element 604 and a third timing element 606. The timing elements, or timing channels, keep track of various elapsed time durations, such as dosing intervals. The inclusion of multiple timing elements allows multiple time periods to be tracked independently. Also, in some embodiments, software may track multiple time periods by checking a time register, for example, that keeps track of time based on a timing mechanism such as a clock. The control module may undertake various beneficial actions at the end of each timer period, such as alerting a patient to take a given medication and/or producing a signal to a medicine station, such as medicine station 200, to inform the medicine station to produce an alert, which may be amplified. The signal may be produced, for example, by a wireless transmitter (not shown).

Alert device 600 also includes an LED 608, a reset switch 610, a speaker 612, and an adhesive backing 614. LED 608 and speaker 612 are indicators used to generate alerts, and any suitable alert mechanism may be used, as would be understood by a person of ordinary skill in the art. An interval indicator 616 labels the interval that the timing device is set to. In a preferred embodiment, alert device 600 may simply be preset to a certain dosing interval that cannot be changed. In more complex embodiments, users may be able to alter the interval. In programmable embodiments, a pharmacist or other health care professional may select an alert device with the correct dosing interval and attach the alert device to a medicine container or box. In changeable embodiments, the pharmacist or medical professional may download the correct dosing interval for the given medication. In further changeable embodiments, the pharmacist or medical professional may lock the dosing interval in place after setting the dosing interval using a security code, logic that prevents altering the dosing interval after it is set, or any other suitable mechanism. In such embodiments, patients would not be capable of accidentally or intentionally changing the dosing interval.

Some embodiments of the present invention also address the problem of "alarm creep". For instance, consider the example where one dose of a medication is required every twelve hours. Suppose that the first dosing interval expires, and the apparatus alerts the patient using the indicators of FIG. 6. Five minutes later, when the patient has taken the required dose of medicine, the patient activates a switch on the alert device to indicate that the dose has been taken. If the twelve hour dosing interval is started at this point, then the second alert will occur twenty four hours and five minutes after the timing of the first dosing interval began. Hence, five minutes of "alarm creep" have occurred after the first dosing interval. If this continues, alarm creep will accumulate for every dose and alerts will be generated later and later. Accordingly, it may be desirable to eliminate or adjust for alarm creep.

The elimination or control of alarm creep must be considered in light of the urgency of compliance. Most medicine regiments take into consideration sleep time at night and allow a longer dosing interval to allow for sleep. Human interaction when resetting the next dosing interval ensures that a safe interval is maintained. This may push each consecutive dosing time forward and the last dose of the day a little into the time allocated for sleep. By resetting the alert device at the beginning of the first dosing time of the new day, generally referred to as the initial start time, all compliance errors of the previous day are cancelled. A preferred embodiment controls alarm creep by this method to assure safe dosing separation.

Whenever medicine dosing intervals are required to be constant throughout a 24 hour period, such as every four or every six hours throughout the night, then the next dosing interval will start timing immediately on expiration of the current dosing time. In this case, there is no alarm creep. The user must make great effort to get to the medication within 30 minutes of the alert. This helps to ensure a reasonably safe separation between doses. A pharmacist may assist in suggesting which embodiment will be appropriate for the specific consumer.

The study of alarm creep, the habits of people, their reluctance or inability to set electronic timing devices, their inclination to resist regimentation and their occasional laziness in responding to alerts in a timely manner are significant focal points, and great effort has been made to have these addressed in some embodiments of the present invention. In these devices, timing and time of day accuracy is most practical when constructed in such a way that use is encouraged by catering to real attitudes and habits of the consumer.

One way to control alarm creep is to use second timing element 604 to time recurring twenty four hour periods. Each time that the control module determines that second timing element 604 has timed the entire twenty four hour duration, the control module may cause the timing module to reset the timing element 604 to time another twenty four hour period. This prevents further alarm creep by immediately resetting the timer period after the second dosing period.

Another way to eliminate alarm creep is to start timing the next dosing interval immediately upon the expiration of the current dosing interval. The patient alert would persist until cleared by the patient through the activation of a switch on the alert device, such as reset switch 610. Since the next dosing interval is already being timed when the alert is cleared, there can be no alarm creep. Yet another way to reduce alarm creep is to issue an alert prior to the expiration of a dosing interval. This can be useful in counteracting time losses that occur due to a patient's response time in responding to an alert.

Figure 7:
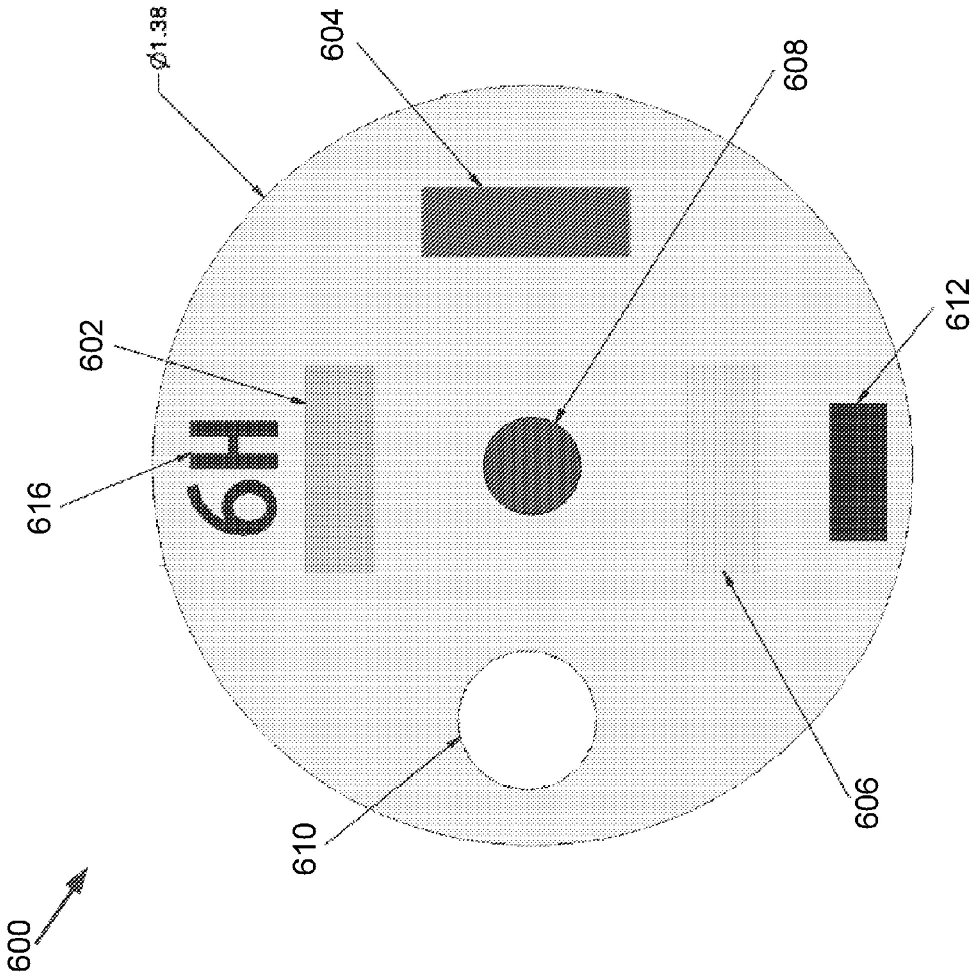
FIG. 7 illustrates a top view of an alert device, according to an embodiment of the present invention.

FIG. 7 illustrates a top view of alert device 600, according to an embodiment of the present invention. Alert device 600 has a diameter of 1.38 inches, and may be designed to have a diameter conforming to various commonly used medicine container sizes, but the size and shape of alert device 600 may vary as desired by the designer. In some embodiments, alert device 600 may fasten to the cap, bottom or side of a medicine bottle—for example, via adhesive backing 614 illustrated in FIG. 6. In implementations where alert device 600 is intended to be attached to the bottom of a medicine container, LED 608 and reset button 610 may be slightly recessed so as to allow the medicine container to have more stability when resting on a surface, as well as to prevent reset button 610 from being inadvertently depressed. In certain embodiments more specifically described in U.S. patent application Ser. No. 12/466,332, the priority of which is claimed by the present application, the alert device may be flexible and may bend so as to conform to many medicine container surfaces due to the presence of a flexible substrate. A twist lock mechanism may engage an auto reset feature whenever a container with alert device 600 attached is picked up and put back down and locked onto the announcer or standalone unit. Optionally, a person may reset the alert using the attached reset button.

Figure 8:
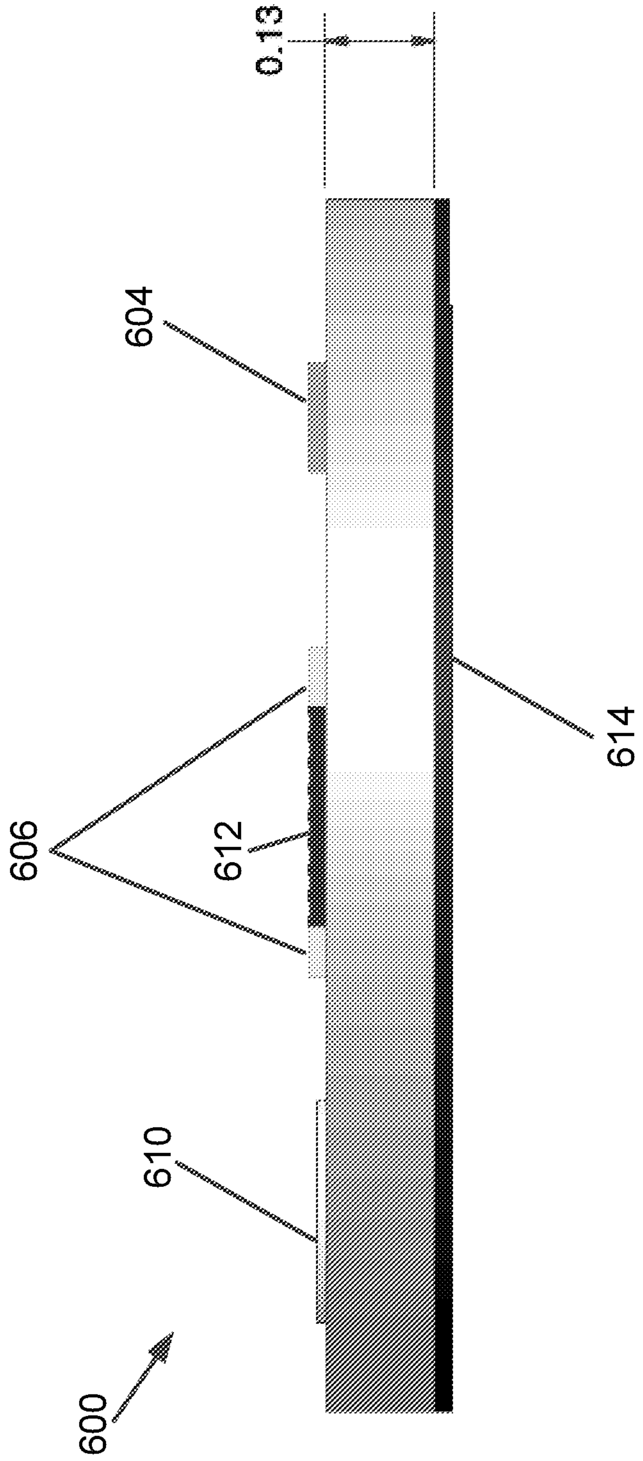
FIG. 8 illustrates a side view of an alert device, according to an embodiment of the present invention.

FIG. 8 illustrates a side view of alert device 600, according to an embodiment of the present invention. From this view, only the sides of third timing element 606 are visible around speaker 612. The height of alert device 600 in this embodiment is 0.13 inches, not including adhesive backing 614.

Figure 9:
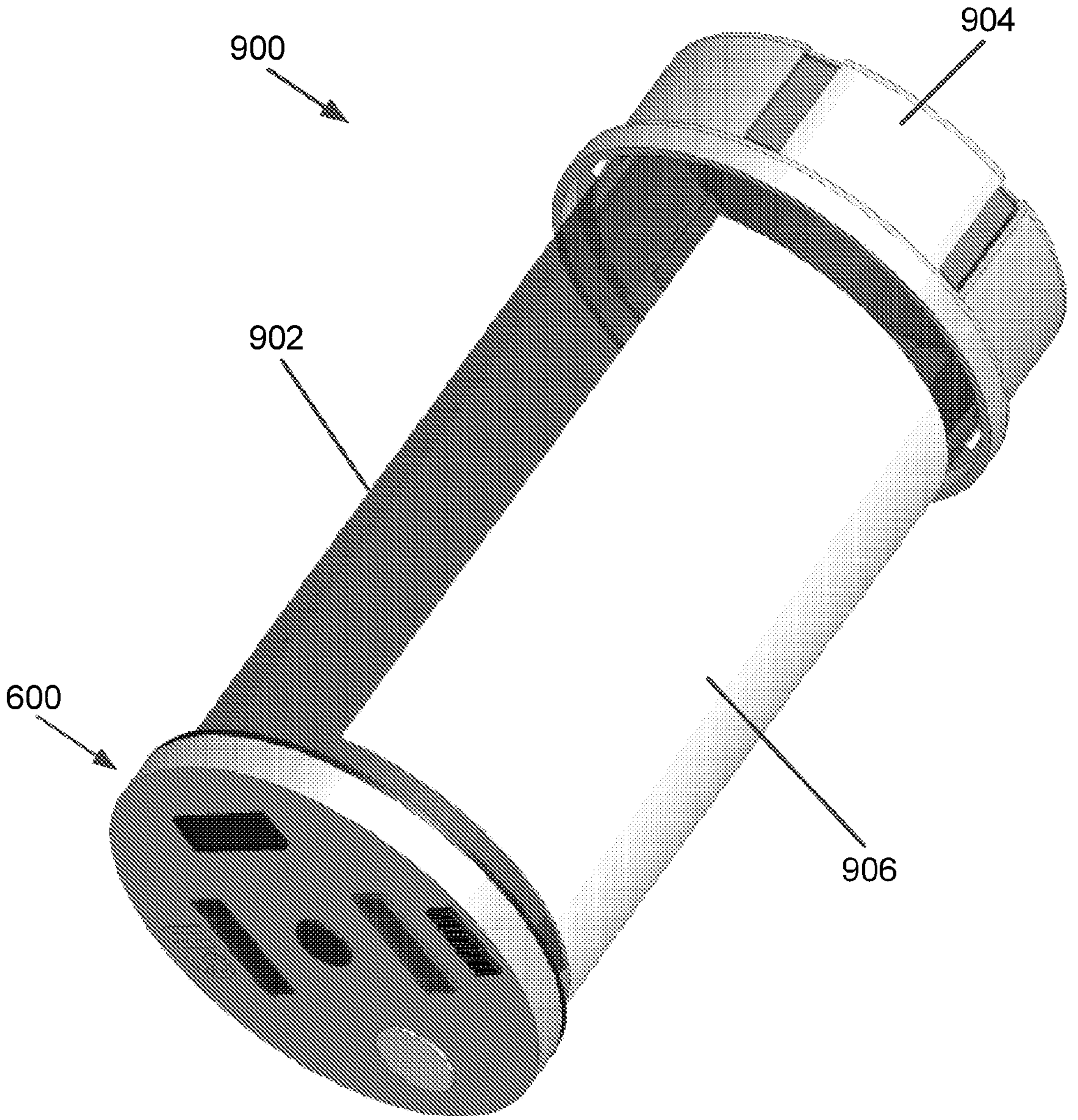
FIG. 9 illustrates a perspective view of a medicine container with an alert device attached thereto, according to an embodiment of the present invention.

FIG. 9 illustrates a perspective view of a medicine container 900 with alert device 600 attached thereto, according to an embodiment of the present invention. Medicine container 900 is a typical medicine container with a body 902, a cap 904, and a label 906. Alert device 600 is affixed to the bottom of medicine container 900. By affixing alert device 600 to the bottom of medicine container 900, label 906 is clearly visible, allowing a patient to read information pertaining to the medication.

Figure 10:
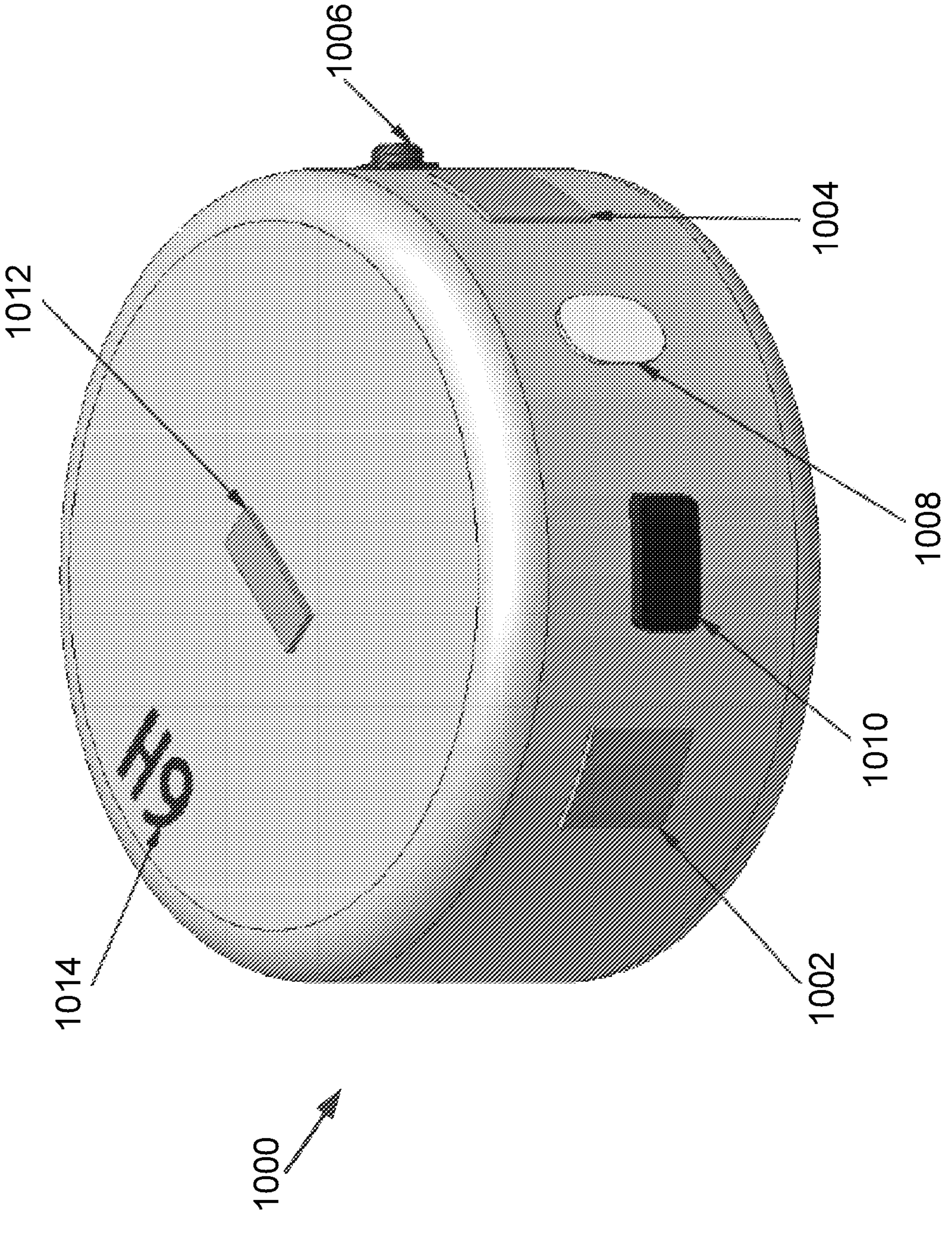
FIG. 10 illustrates an elevated view of a stand-alone alert device, according to an embodiment of the present invention.

FIG. 10 illustrates an elevated view of a stand-alone alert device 1000, according to an embodiment of the present invention. The operations of stand-alone alert device 1000 are controlled by a digital controller (not visible) housed within the device, such as controller 100 of FIG. 1. Stand-alone alert device 1000 includes a first timing element 1002 and a second timing element 1004. Stand-alone alert device 1000 also includes an LED 1006, a reset button 1008, and a speaker 1010. A sensor 1012 is located on the top of stand-alone alert device 1000. The standalone alert device, which is significantly larger and has a more powerful power supply than the primary alert device (such as alert device 600 of FIG. 6), may be configured to work with the primary alert device. A person may choose to use the standalone device with or without the primary alert device. When used with primary alert device 600, the sensor on standalone alert device 1000 is activated and will detect the alert signal from primary alert device 600, and then amplifies that signal. When used without alert device 600, standalone alert device 1000 alone may perform alerts. In this embodiment, the sensor may be deactivated. This method of use may be preferred when portability outside the home is required. A label 1014 indicates the hard-wired dosing time. However, as with the attachable embodiments discussed in FIGS. 6-9, the medicine dosing time may be reprogrammed in some embodiments.

Figure 11:
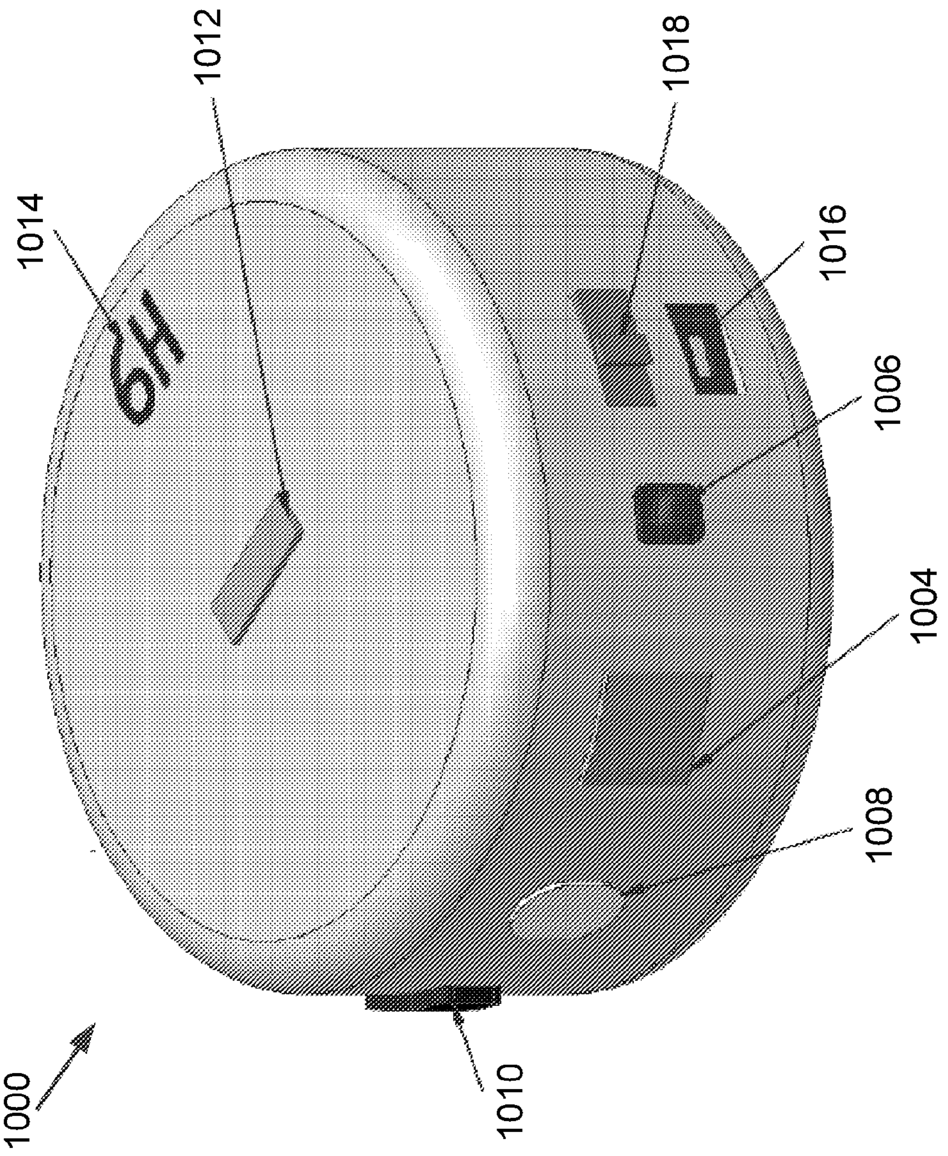
FIG. 11 illustrates another elevated view of a stand-alone alert device, according to an embodiment of the present invention.

FIG. 11 illustrates another elevated view of stand-alone alert device 1000, according to an embodiment of the present invention. In this view, a USB port 1016 and a vibrator selector switch 1018 are also visible. USB port 1016 allows for information, including dosing times and compliance information regarding when and how often a patient takes medication, to be downloaded from and uploaded to an external computing device. Compliance information may be determined, for example, by recording when a patient hits reset button 1008. While not shown, an on/off switch may also be included in some embodiments.

Figure 12:
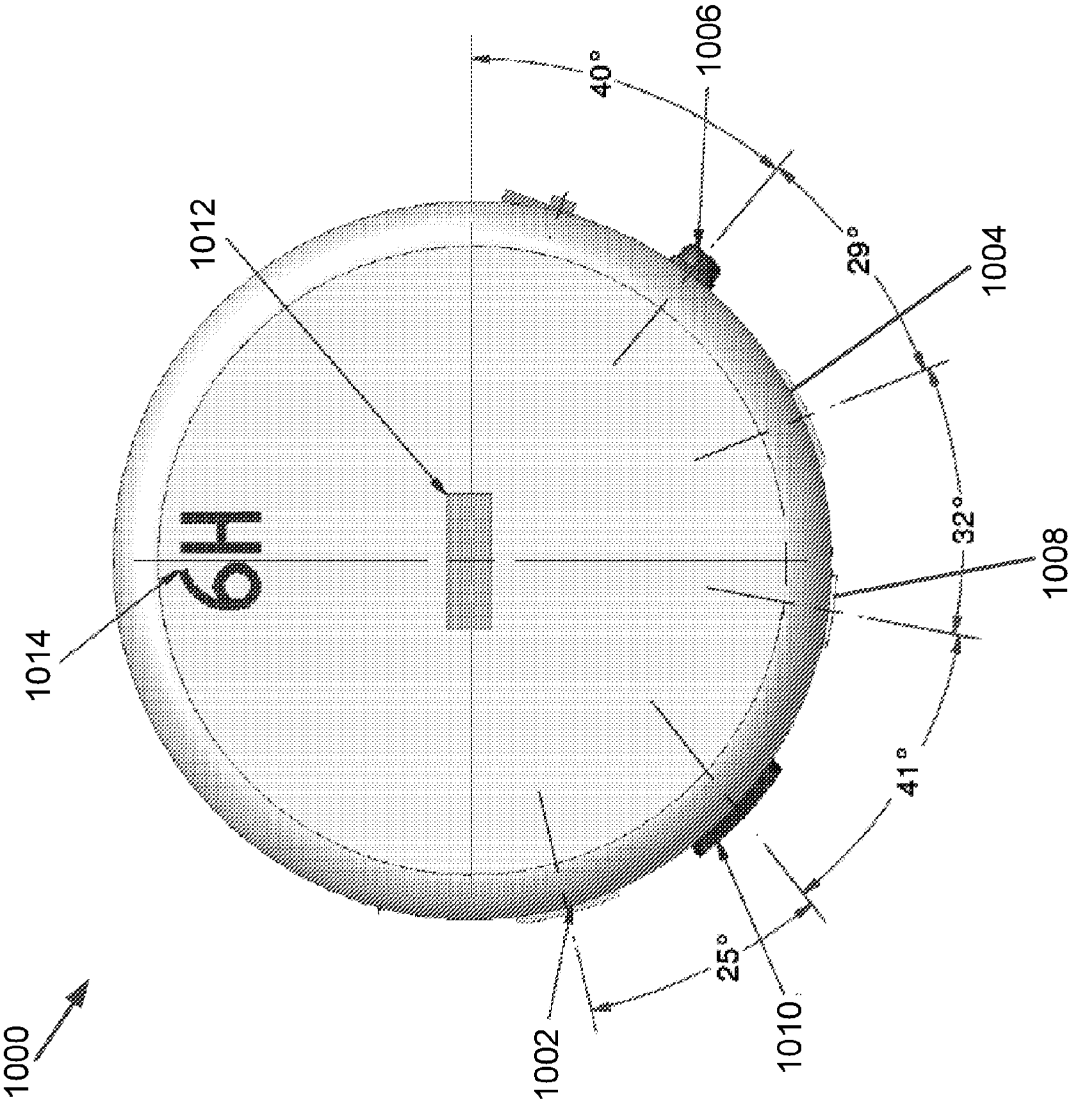
FIG. 12 illustrates a top view of a stand-alone alert device, according to an embodiment of the present invention.

FIG. 12 illustrates a top view of stand-alone alert device 1000, according to an embodiment of the present invention. Angles between components from the center of stand-alone alert device 1000 are shown. First timing element 1002 and speaker 1010 form an angle of 25°. Speaker 1010 and reset button 1008 form an angle of 41°. Reset button 1008 and second timing element 1004 form an angle of 32°. Second timing element 1004 and LED 1006 form an angle of 29°. LED 1006 has 40° of separation from a horizontal diameter line formed through the center of stand-alone alert device 1000.

Figure 13:
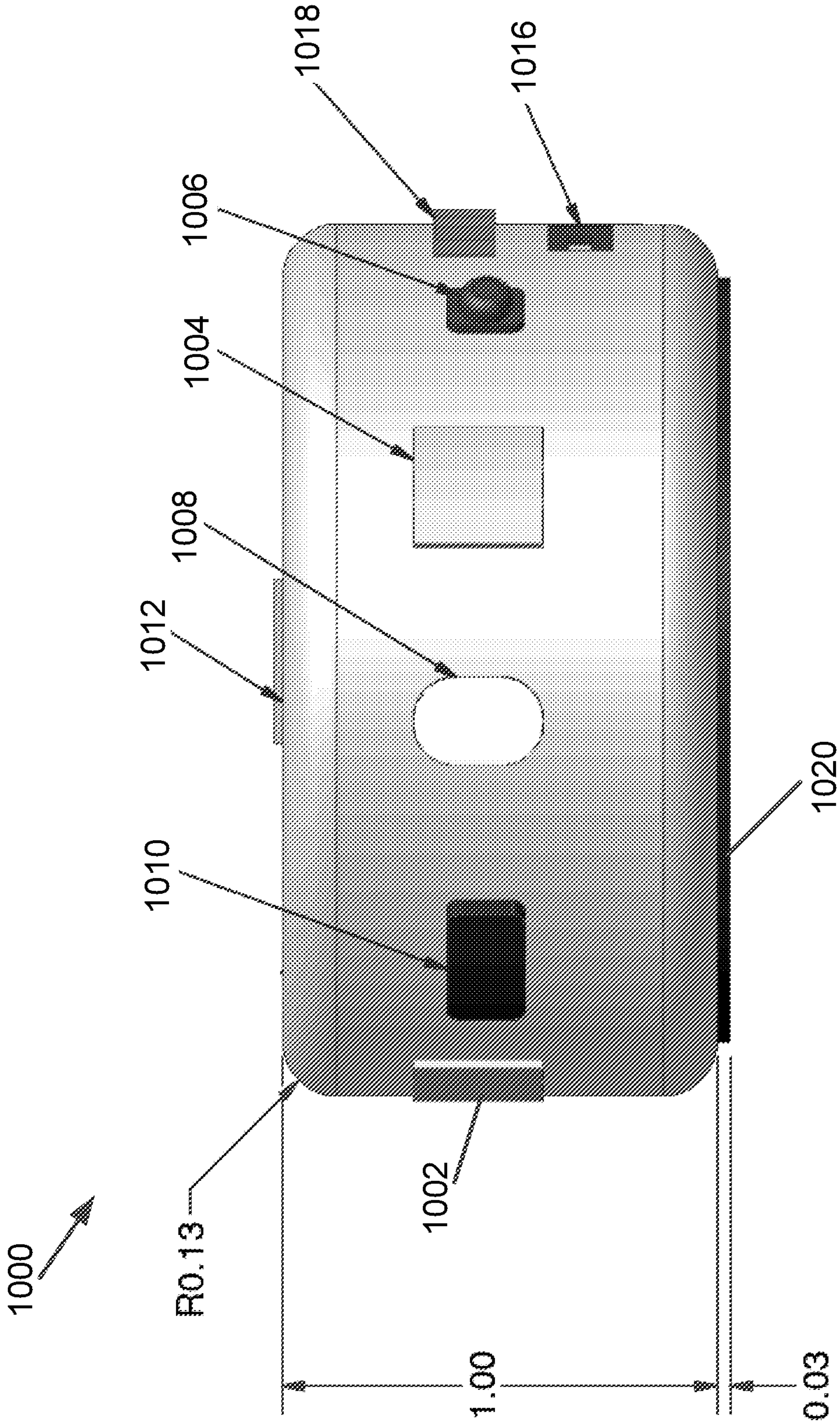
FIG. 13 illustrates a side view of a stand-alone alert device, according to an embodiment of the present invention.
Figure 14:
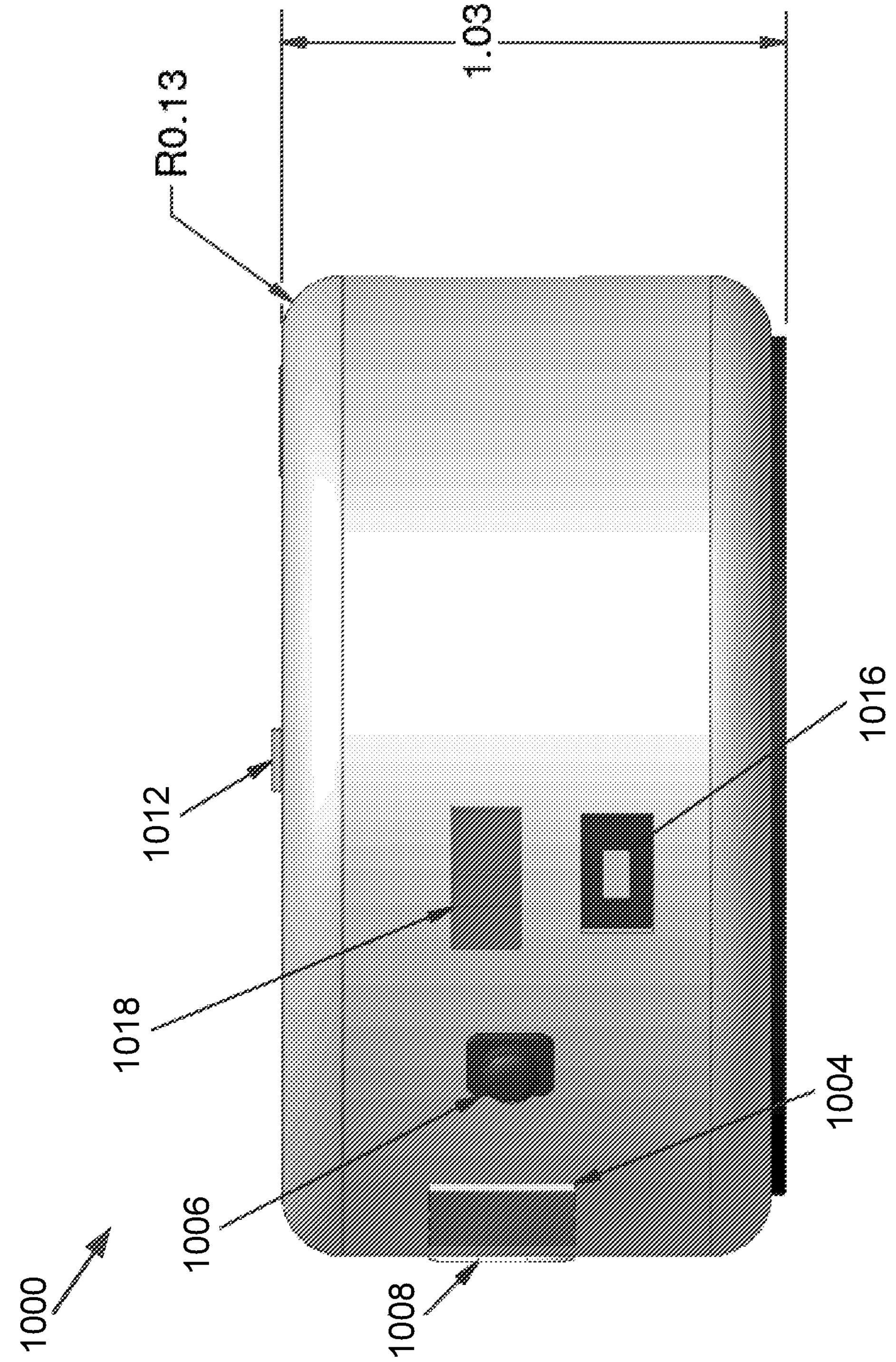
FIG. 14 illustrates another side view of a stand-alone alert device, according to an embodiment of the present invention.

FIG. 13 illustrates a side view of stand-alone alert device 1000, according to an embodiment of the present invention. Stand-alone alert device 1000 has a height of 1.00 inches and base 1020 has a height of 0.03 inches. The radius from the center point for the curved portion of stand-alone alert device 1000 is 0.13 inches. FIG. 14 illustrates another side view of stand-alone alert device 1000, according to an embodiment of the present invention. The total height of stand-alone alert device 1000, including base 1020, is 1.03 inches.

Figure 15:
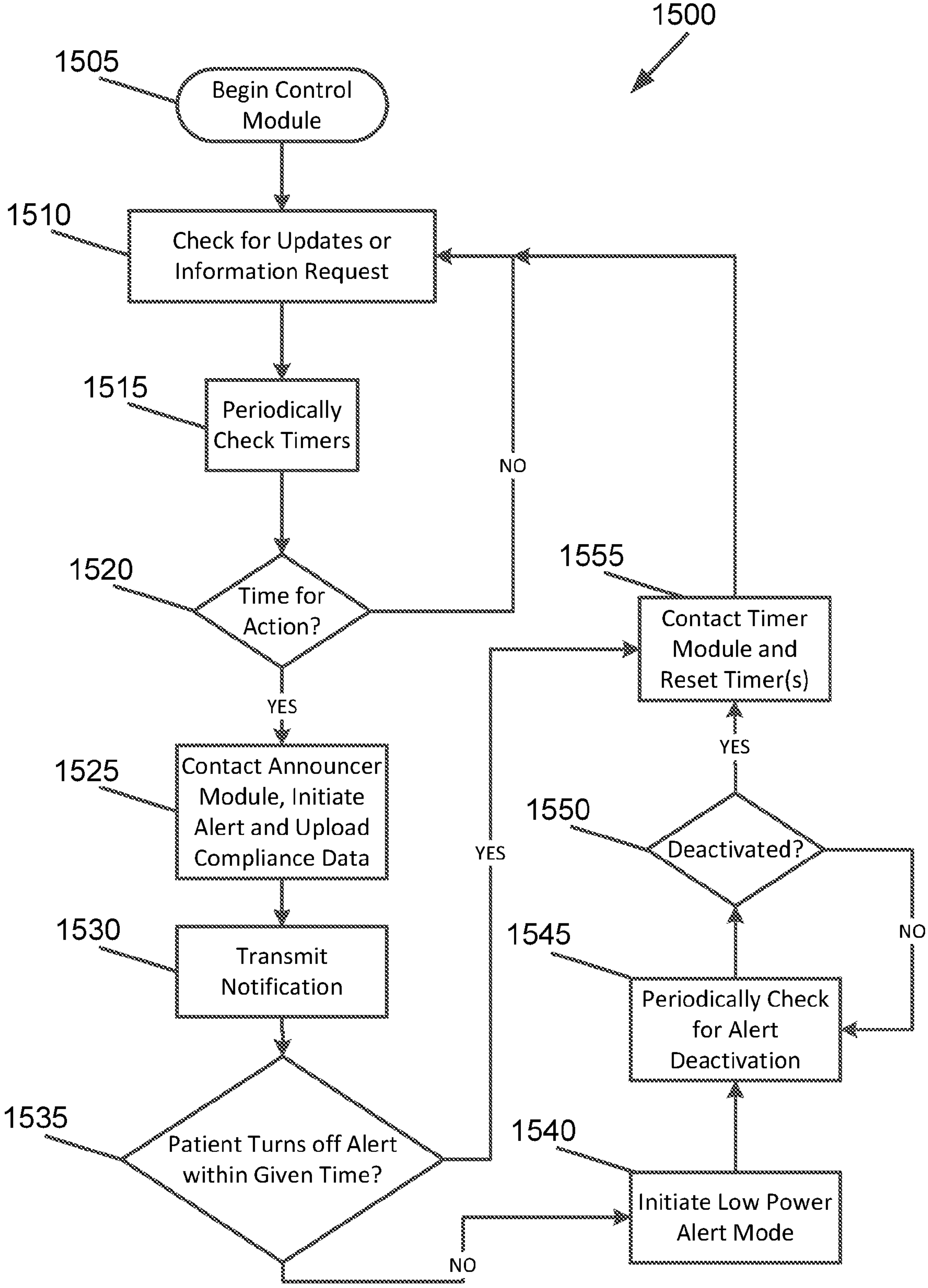
FIG. 15 is a flowchart illustrating the operation of a control module, timing module and announcer module, according to an embodiment of the present invention.

FIG. 15 is a flowchart 1500 illustrating the operation of a control module, timing module and announcer module, according to an embodiment of the present invention. The process starts with the alert device, such as the alert device of FIGS. 6-8, being activated and the control module beginning at 1505. The control module then checks whether there are external updates or an external information request at 1510. Such a check may be performed periodically and may involve initiating wired or wireless communication with an external communication device. In some embodiments, the external communication device may initiate communication with the alert device.

The control module next checks with the timer module to see whether one or more timers have elapsed at 1515. Such a check may be performed periodically. The timers may track, for example, periods for medicine dosing times and/or the actual time. The timers may perform a simple countdown, compare one or more timers to the actual time, or utilize any other mechanism for tracking time as would be understood by one of ordinary skill in the art. If it is not time to take one or more actions based on the timers at 1520, the process returns to checking for updates and external information and periodically checking the timers at 1510.

However, if it is time to perform an action, the control module instructs the announcer module to initiate an alert and upload compliance data at 1525. The compliance data may be sent to an external computing device so health professionals, family members, etc. can monitor when and how often a patient is taking medication, for example. Failure of a patient to comply with medicine dosing requirements may also indicate that the patient is in trouble, needs assistance, or is incapacitated in some fashion. The announcer module may make use of speakers, flashing lights, a vibrating mechanism, any other suitable alerting mechanism, or any combination thereof. For example, in some embodiments, the announcer module may cause an LED to flash, cause the alert device to vibrate, and initiate an audio message that indicates useful information, such as that it is time to take a medication, which mediation to take, and the like. The control module then causes the alert device to transmit a notification to an external device at 1530, such as medicine station 200 from FIGS. 2-5 or stand-alone alert device 1000 from FIGS. 10-14.

The control module checks whether a patient has turned off the alert within a given time period at 1535. If a patient is not present at dosing time, it may be useful to switch to a power saving mode after a predetermined period of time has elapsed. For example, perhaps the alert device initially vibrates, flashes and offers an audio announcement. If a patient has not deactivated the alert within two minutes, for instance, the control module may cause the alert device to switch to a low power alert mode, such as increasing the volume and/or the time between audio signals, alerting only with a periodically flashing LED, or any other alert or combination of alerts that consumes less power. If still no action is taken after 30 minutes, the controller may initiate a phone call to a programmed number.

If the patient deactivates the alert within the predetermined time period, the control module contacts the timer module and to reset the appropriate timer(s) at 1555. The process then proceeds back to 1510. However, if the patient has not deactivated the alert within the predetermined time period, the control module contacts the announcer module, which switches to a low power alert mode at 1540. The control module then periodically checks whether the patient has deactivated the alert at 1545. If the patient has not deactivated the alert at 1550, the process proceeds back to 1545. However, if the patient has deactivated the alert at 1550, the control module contacts the timer module to reset the appropriate timer(s) at 1555 and the process then proceeds back to 1520.

Figure 16:
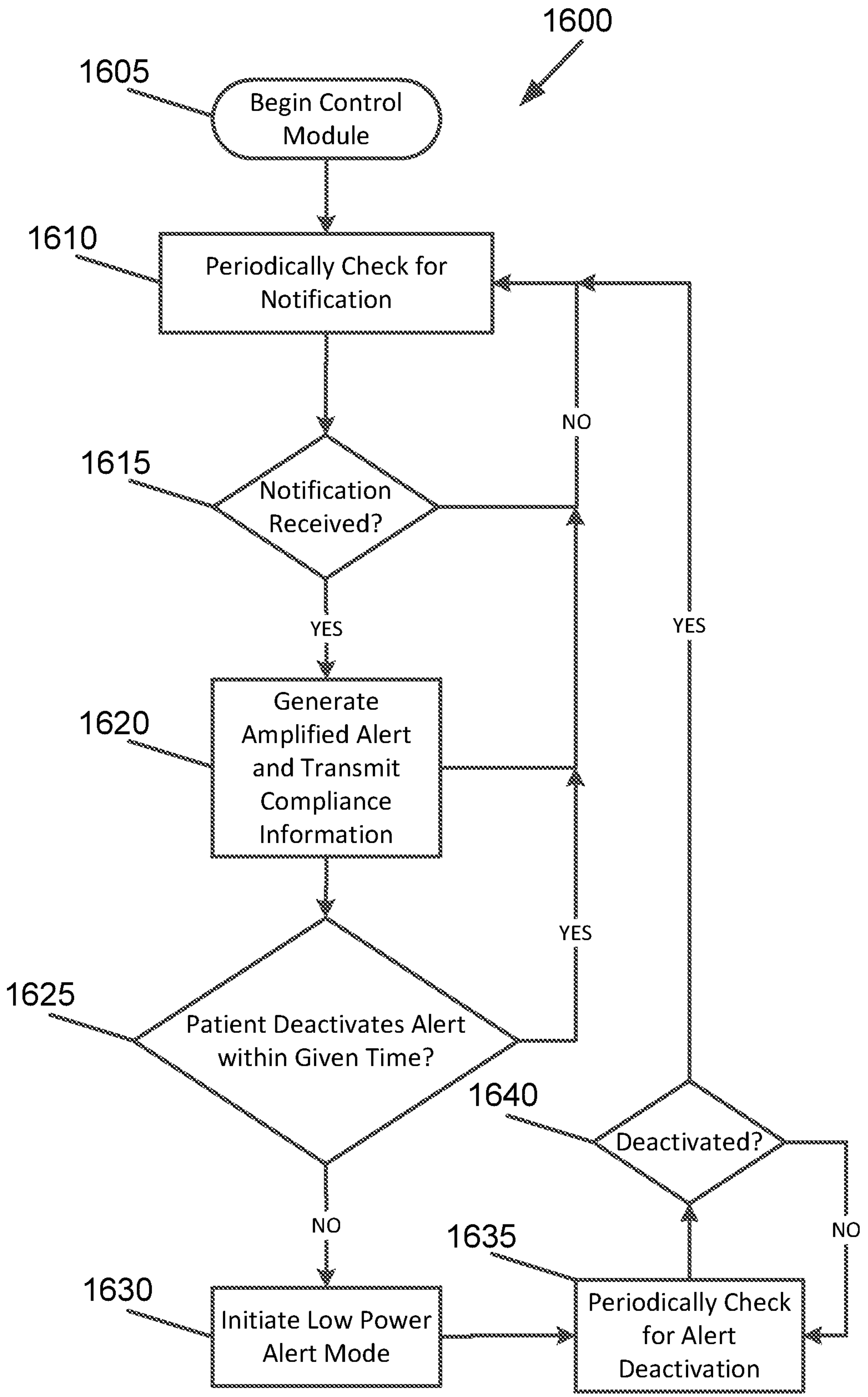
FIG. 16 is a flowchart illustrating a method for generating an amplified alert, according to an embodiment of the present invention.

FIG. 16 is a flowchart 1600 illustrating a method for generating an amplified alert, according to an embodiment of the present invention. The process starts with a stand-alone alert device or medicine station being activated and the control module beginning at 1605. The medicine station may be medicine station 200 from FIGS. 2-5 and the stand-alone alert device may be stand-alone alert device 1000 from FIGS. 10-14.

The control module then periodically checks for notifications that it is time to take a medication at 1610. If no notification has been received at 1615, the control module returns to periodically checking for notifications at 1610. However, if a notification has been received at 1615, the control module causes the medicine station or stand-alone alert device to generate an amplified alert that is more powerful than the alert generated by a primary alert device at 1620. The control module also causes the medicine station or stand-alone alert device to transmit compliance information to an external computing device.

If a patient deactivates the alert within a given time at 1625, the process returns to periodically checking for notifications at 1610. However, if the patient does not deactivate the alert within a given period of time at 1625, the medicine station or stand-alone alert device enters a low power alert mode at 1630. This feature may be especially desirable for embodiments that use batteries, and may not be present for embodiments with less limited power supplies, such as A/C outlet power.

The control program then checks whether the alert has been deactivated at 1635. If the alert has not been deactivated at 1640, the process proceeds to periodically checking for deactivation at 1635. If deactivated, the process returns to periodically checking for notifications at 1610.

It may happen that a patient chooses to set a different time of day as the initial start time. In such a case, the person may find it advantageous to restart the apparatus at a particular time of day using a separate time piece such as a wrist watch or wall clock so as to synchronize the start of the dosing schedule with the time of day. Some embodiments of the present invention enable a person to restart a timer for a dosing schedule by means of a reset button, for example. It may also be possible to reset the dosing schedule by turning the alert device off and then on again.

Certain implants within a person' s body may also transmit signals when that person comes within a certain range of the medicine station. Information may be read from items attached to the person, such as a wrist band that records body temperature and blood pressure. This information may be read and transmitted by the announcer device in addition to the state of other electronic items within and/or attached to the person.

Some embodiments of the present invention pertain to a medicine station and alert device that track dosing intervals and alert patients accordingly. The alert device may have a controller with a control module, a timing module and an announcer module that facilitate the operations of the alert device. The control module may also initiate a low power alert mode via the announcer module if a patient does not respond to the alert and take medication within a predetermined period of time.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but does not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with features in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:

a processor having access to memory, wherein the memory stores a control module, a timing module and an announcer module, and the processor is configured to execute the modules stored in the memory;

a reusable medicine tray comprising a plurality of compartments arranged on a swivel stand, wherein each compartment is configured to store at least one medication bottle; and at least one indicator, wherein the control module is configured to periodically check for an external notification from a primary alert device that it is time to take a medication, and upon receiving the external notification, the control program is configured to cause the apparatus to generate an alert via the at least one indicator.

2. The apparatus of claim 1, wherein the at least one indicator comprises one or more of a Liquid Crystal Display (LCD) screen, a noise making device, and a Light-Emitting Diode (LED).

3. The apparatus of claim 1, further comprising:

a USB port configured to receive updates from, and upload information to, an external computing device.

4. The apparatus of claim 1, further comprising:

at least one sensor configured to detect a notification from the primary alert device.

5. The apparatus of claim 1, wherein the control module is configured to periodically check with the timing module to determine whether at least one timer has elapsed.

6. The apparatus of claim 1, wherein when a time period has elapsed and a user has not deactivated the at least one indicator, the control module is configured to instruct the announcer module to switch to a different alert mode, and the different alert mode comprises a switch from audible to light, audible to vibratory, light to audible, light to vibratory, vibratory to audible, vibratory to light, or from any single alert mode to any combination of two or more of audible, light, and vibratory.

7. The apparatus of claim 1, wherein the control module causes the apparatus to transmit information to an external computing device.

8. The apparatus of claim 1, wherein when a user has not deactivated the amplified alert for a predetermined period of time, the apparatus is configured to transmit a notification to an external computing device alerting another individual that the user has not taken the medication.

9. A computer-implemented method, comprising: a primary alert device generating a primary alert at a time to take medication;

periodically checking, via a controller, for an external notification from a primary alert device that it is time to take a medication; and causing, via the controller separate from the primary alert device, at least one indicator of a medicine station or stand-alone alert device to generate an amplified repeater alert with respect to the primary alert device, wherein the amplified repeater alert is amplified to be more human-recognizable than an alert generated by the primary alert device.

10. The method of claim 9, further comprising:

when a user does not deactivate the indicators within a predetermined time period, changing, via the controller, the at least one indicator to switch to operating in a different mode, wherein the different alert mode comprises a switch from audible to light, audible to vibratory, light to audible, light to vibratory, vibratory to audible, vibratory to light, or from any single alert mode to any combination of two or more of audible, light, and vibratory.

11. The method of claim 9, wherein the at least one indicator comprises one or more of a Liquid Crystal Display (LCD) screen, a noise making device and a Light-Emitting Diode (LED).

12. The method of claim 9, wherein at least one sensor detects the notification from a primary alert device.

13. The method of claim 9, further comprising:

transmitting information to an external computing device.

14. The method of claim 9, further comprising:

transmitting a notification to an external computing device alerting another individual that the user has not taken the medication when the user has not deactivated the amplified alert for a predetermined period of time.

* * * * *